(12) United States Patent
Oh

(10) Patent No.: US 10,270,163 B2
(45) Date of Patent: Apr. 23, 2019

(54) COMMUNICATION MODULE AND COMMUNICATION DEVICE INCLUDING SAME

(71) Applicant: LG Innotek Co., Ltd., Seoul (KR)

(72) Inventor: Sae Won Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 18 days.

(21) Appl. No.: 15/574,722

(22) PCT Filed: Mar. 18, 2016

(86) PCT No.: PCT/KR2016/002750
§ 371 (c)(1),
(2) Date: Nov. 16, 2017

(87) PCT Pub. No.: WO2016/186304
PCT Pub. Date: Nov. 24, 2016

(65) Prior Publication Data
US 2018/0151952 A1     May 31, 2018

(30) Foreign Application Priority Data

May 19, 2015  (KR) .......................... 10-2015-0069669

(51) Int. Cl.
*H01Q 21/00* (2006.01)
*H01Q 1/52* (2006.01)
(Continued)

(52) U.S. Cl.
CPC ............... *H01Q 1/523* (2013.01); *H01Q 1/38* (2013.01); *H01Q 1/52* (2013.01); *H01Q 9/0421* (2013.01);
(Continued)

(58) Field of Classification Search
CPC .......... H01Q 1/52; H01Q 1/38; H01Q 9/0421; H01Q 9/42; H01Q 21/00
(Continued)

(56) References Cited

U.S. PATENT DOCUMENTS

2004/0189530 A1*  9/2004  Chung ...................... H01Q 1/38
                                              343/700 MS
2015/0288055 A1* 10/2015  Youm ...................... H01Q 1/40
                                              343/702
(Continued)

FOREIGN PATENT DOCUMENTS

KR     10-2009-0093120 A     9/2009
KR        10-1139703 B1      4/2012
(Continued)

OTHER PUBLICATIONS

International Search Report in International Application No. PCT/KR2016/002750, filed Mar. 18, 2016.

*Primary Examiner* — Huedung X Mancuso
(74) *Attorney, Agent, or Firm* — Saliwanchik, Lloyd & Eisenschenk

(57) ABSTRACT

One embodiment of a communication module can comprise: a first antenna printed on a substrate and provided in a plate shape; a second antenna spaced from the first antenna, printed on the substrate, and provided in a plate shape; a third antenna coupled to the substrate, provided in a three-dimensional shape, and transmitting or receiving a radio wave of a frequency band which is the same as or similar to that of the first antenna; a fourth antenna coupled to the substrate, provided in a three-dimensional shape, and transmitting or receiving a radio wave of a frequency band which is the same as or similar to that of the second antenna; and an integrated circuit electrically connected to the first to fourth antennas, mounted on the substrate, applying currents
(Continued)

to the first to fourth antennas, and processing a transmitted or received signal.

19 Claims, 11 Drawing Sheets

(51) Int. Cl.
    *H01Q 1/38*     (2006.01)
    *H01Q 9/04*     (2006.01)
    *H01Q 9/42*     (2006.01)
    H04B 1/00     (2006.01)
    H01Q 5/30     (2015.01)
    H04W 4/80     (2018.01)
    H01Q 1/22     (2006.01)
    H04W 84/12     (2009.01)
    H01Q 1/24     (2006.01)
    H01Q 21/28     (2006.01)
    H01Q 5/371     (2015.01)
    H01Q 5/378     (2015.01)

(52) U.S. Cl.
    CPC .............. *H01Q 9/42* (2013.01); *H01Q 1/2291* (2013.01); *H01Q 1/243* (2013.01); *H01Q 5/30* (2015.01); *H01Q 5/371* (2015.01); *H01Q 5/378* (2015.01); *H01Q 21/0025* (2013.01); *H01Q 21/28* (2013.01); *H04B 1/00* (2013.01); *H04W 4/80* (2018.02); *H04W 84/12* (2013.01)

(58) Field of Classification Search
    USPC .......................................................... 343/725
    See application file for complete search history.

(56) References Cited

U.S. PATENT DOCUMENTS

| | | | |
|---|---|---|---|
| 2016/0254588 A1* | 9/2016 | Kim | H01Q 1/24 343/702 |
| 2016/0286169 A1* | 9/2016 | Sannala | H01Q 21/28 |
| 2017/0214123 A1* | 7/2017 | Park | H01Q 1/243 |

FOREIGN PATENT DOCUMENTS

| | | |
|---|---|---|
| KR | 10-1416931 B1 | 7/2014 |
| KR | 10-2014-0130785 A | 11/2014 |
| KR | 10-2015-0012932 A | 2/2015 |

* cited by examiner

[FIG. 1]
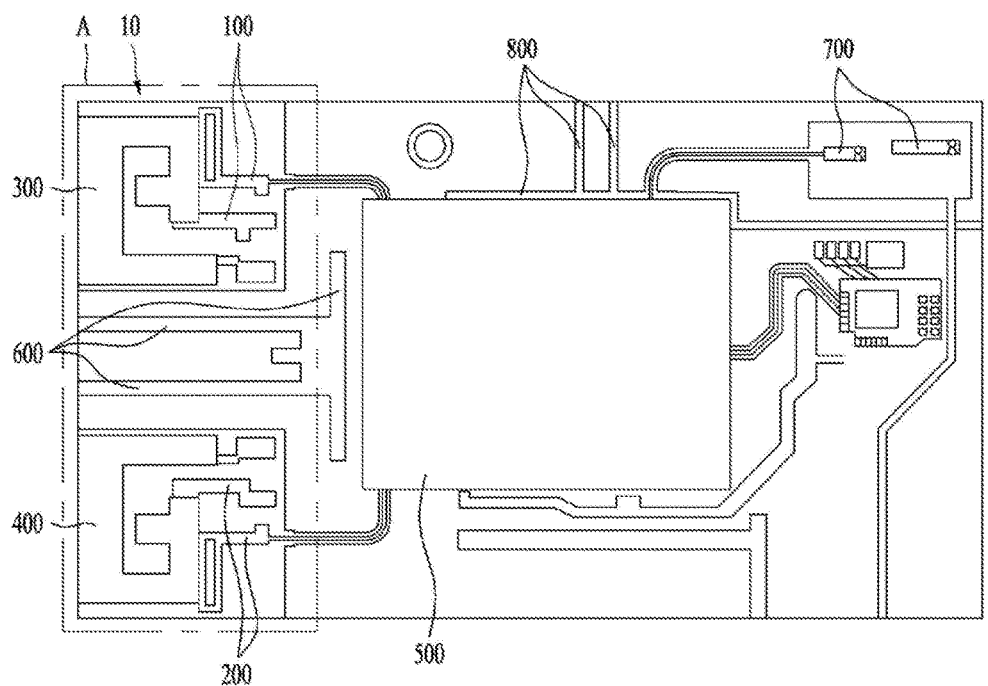

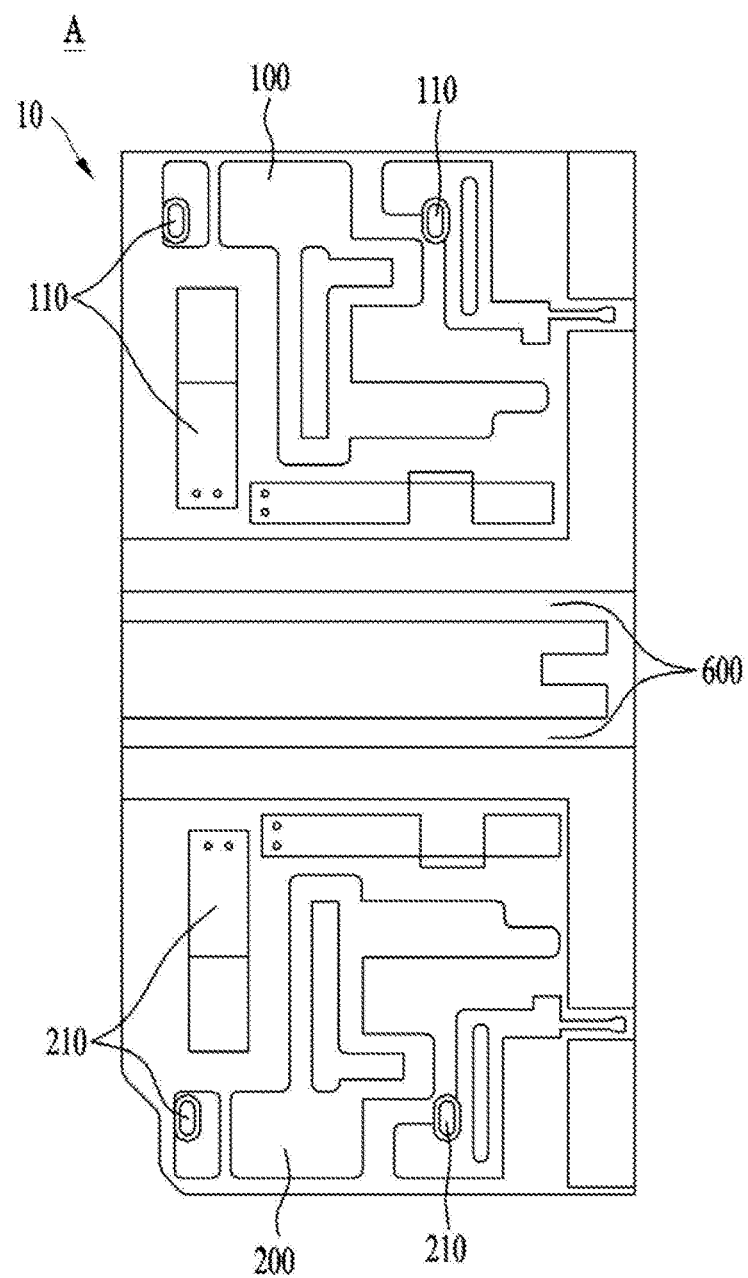
[FIG. 2]

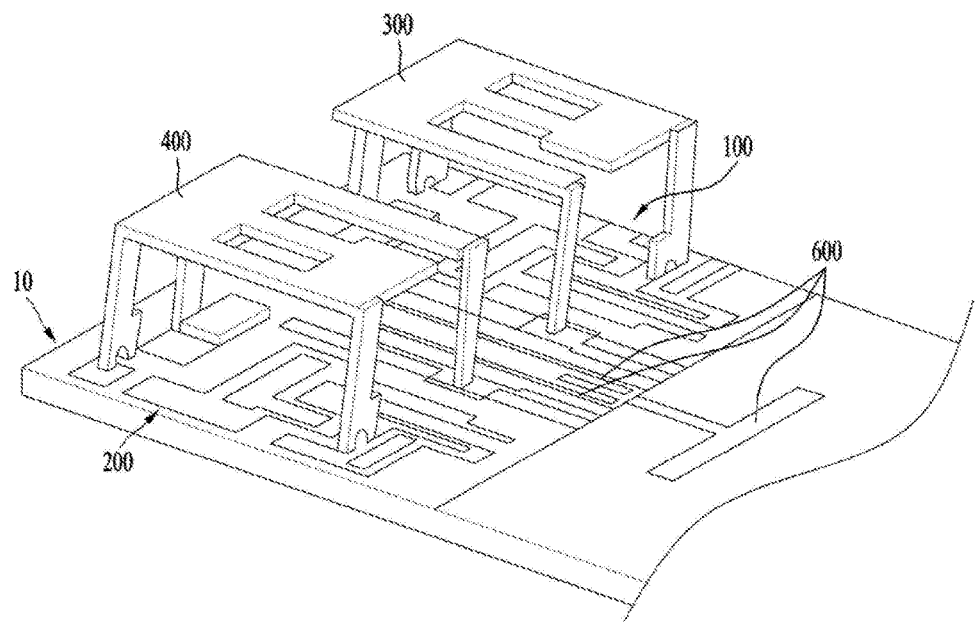
[FIG. 3]

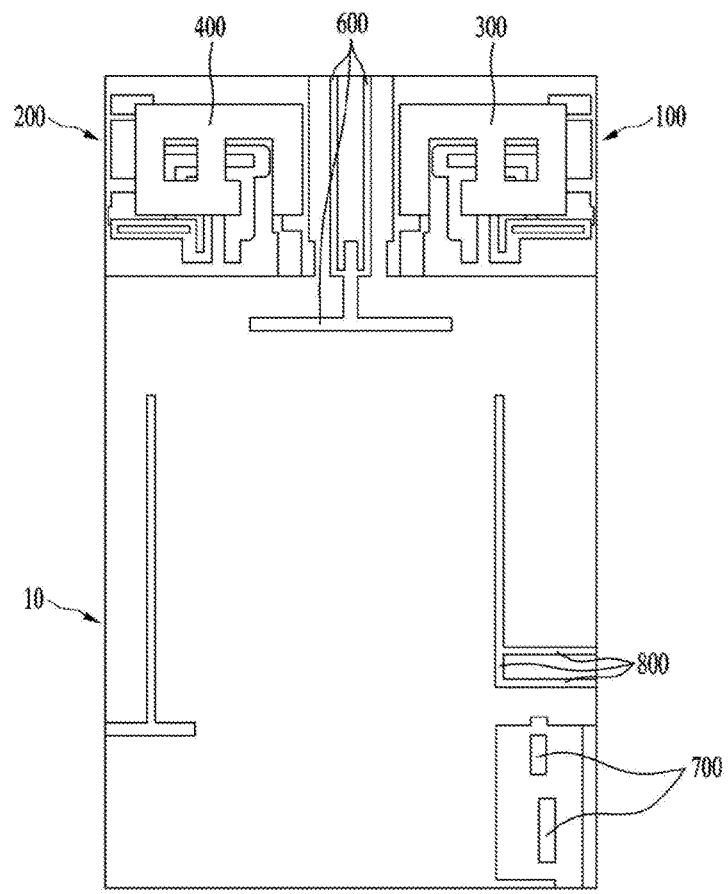
[FIG. 4]

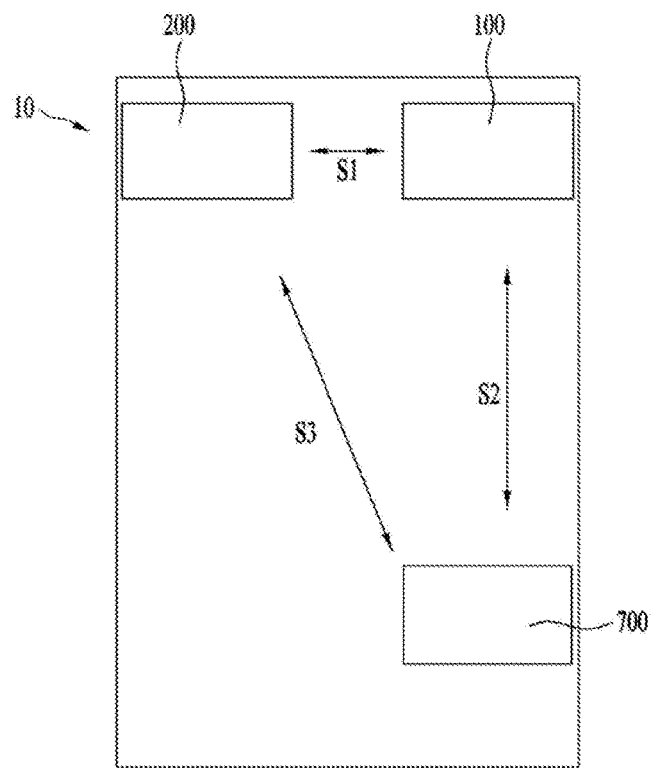

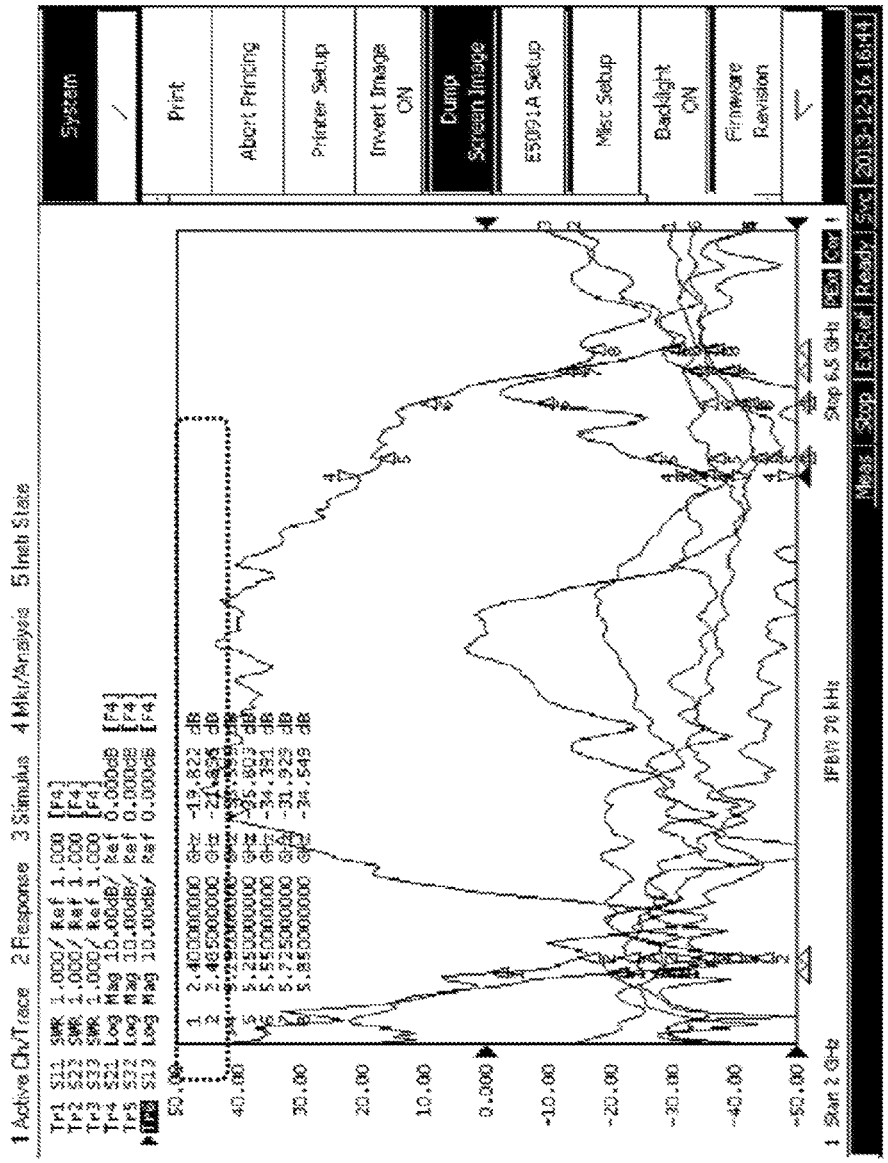
[FIG. 6]

[FIG. 7]
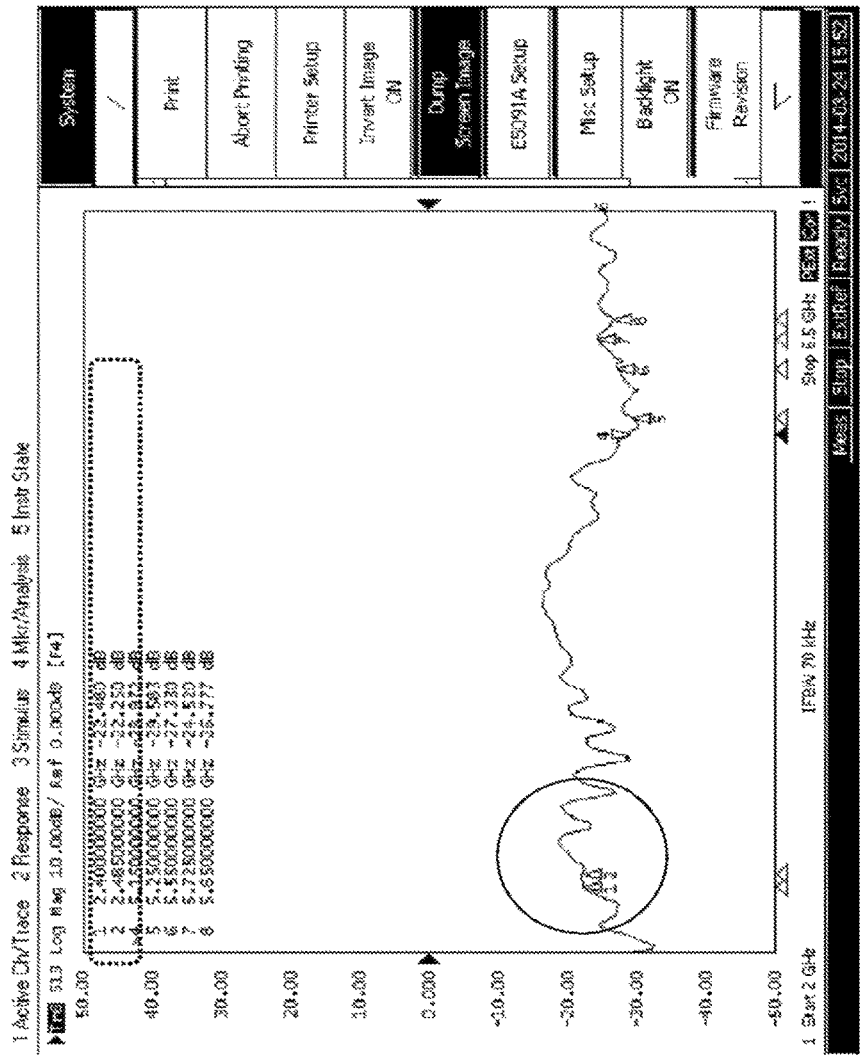

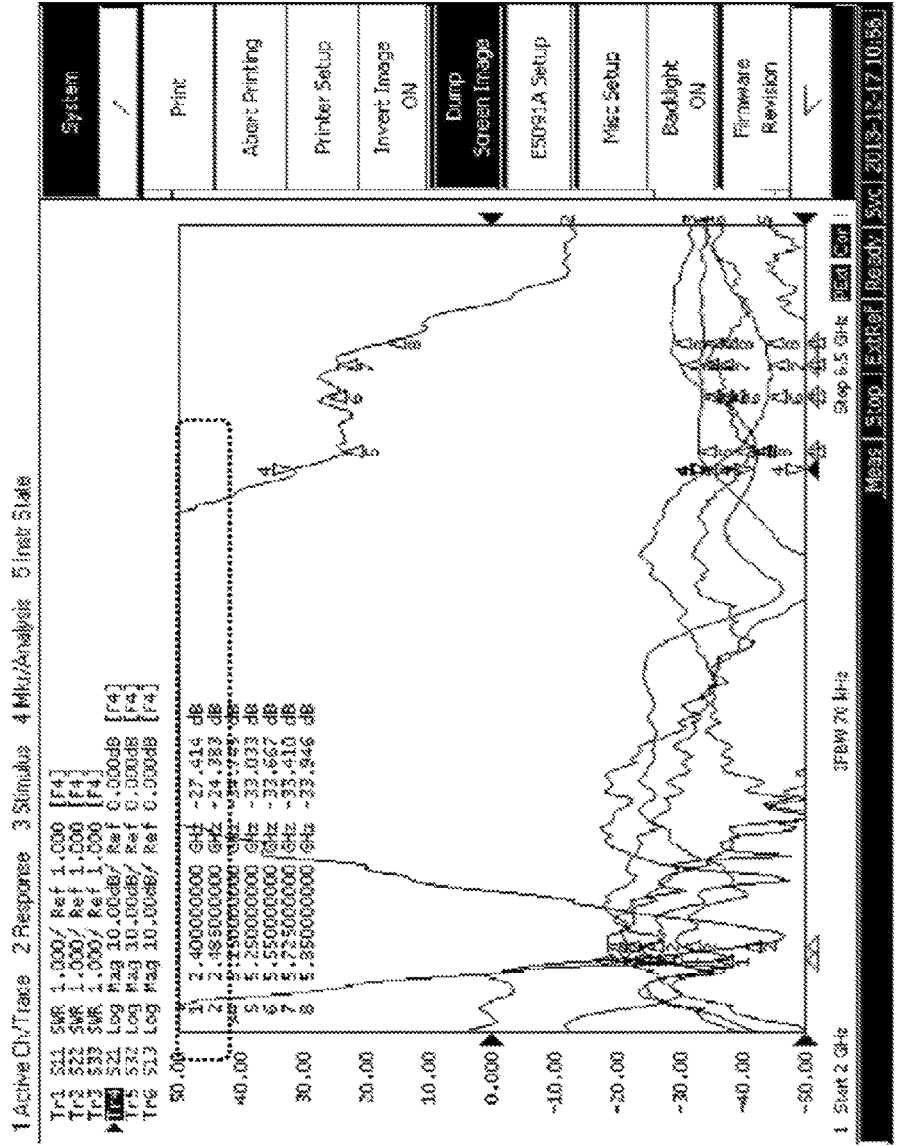
[FIG. 8]

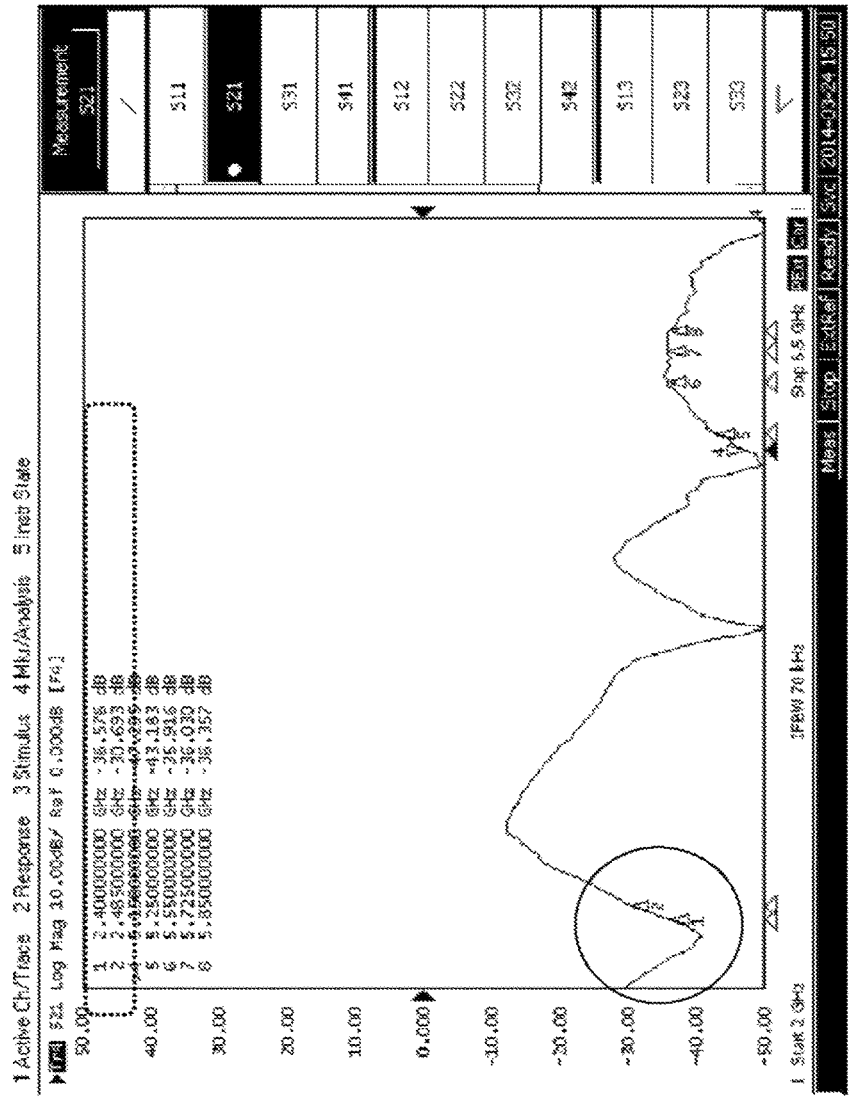
[FIG. 9]

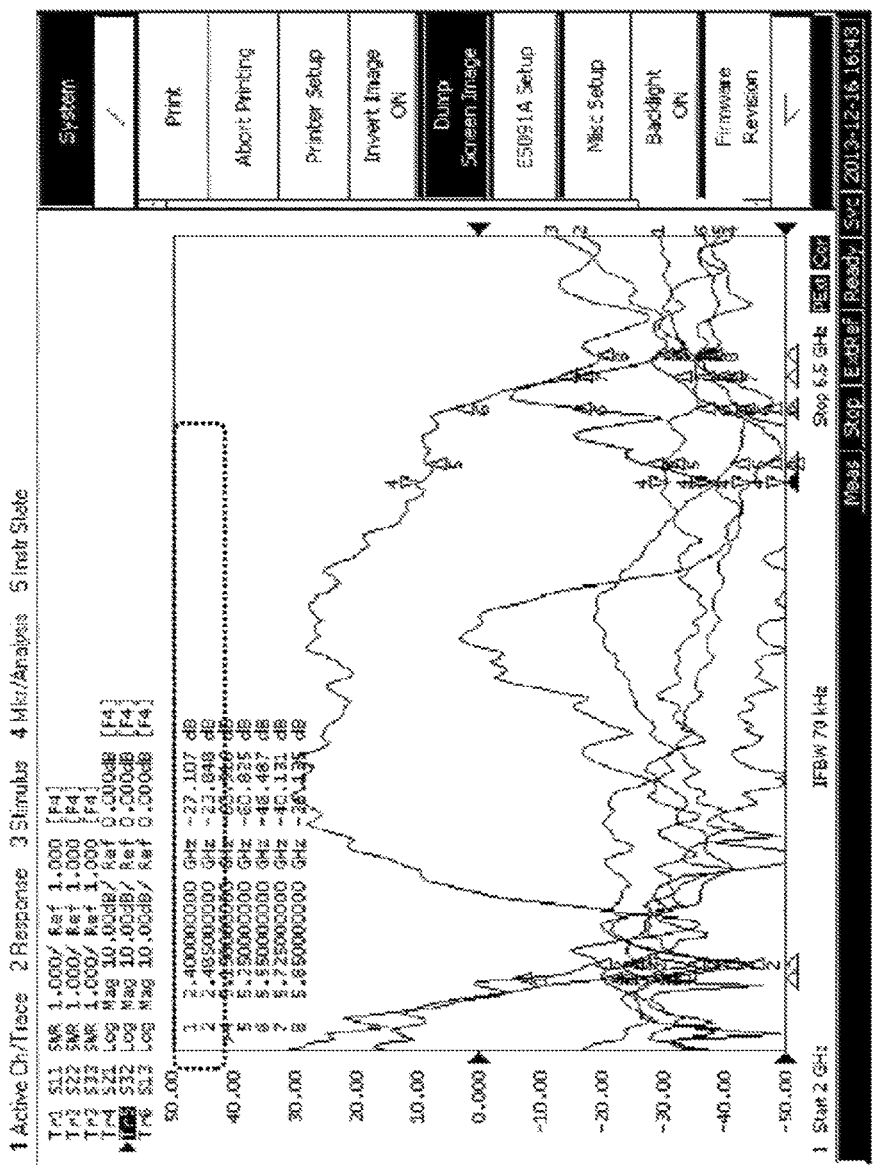
[FIG. 10]

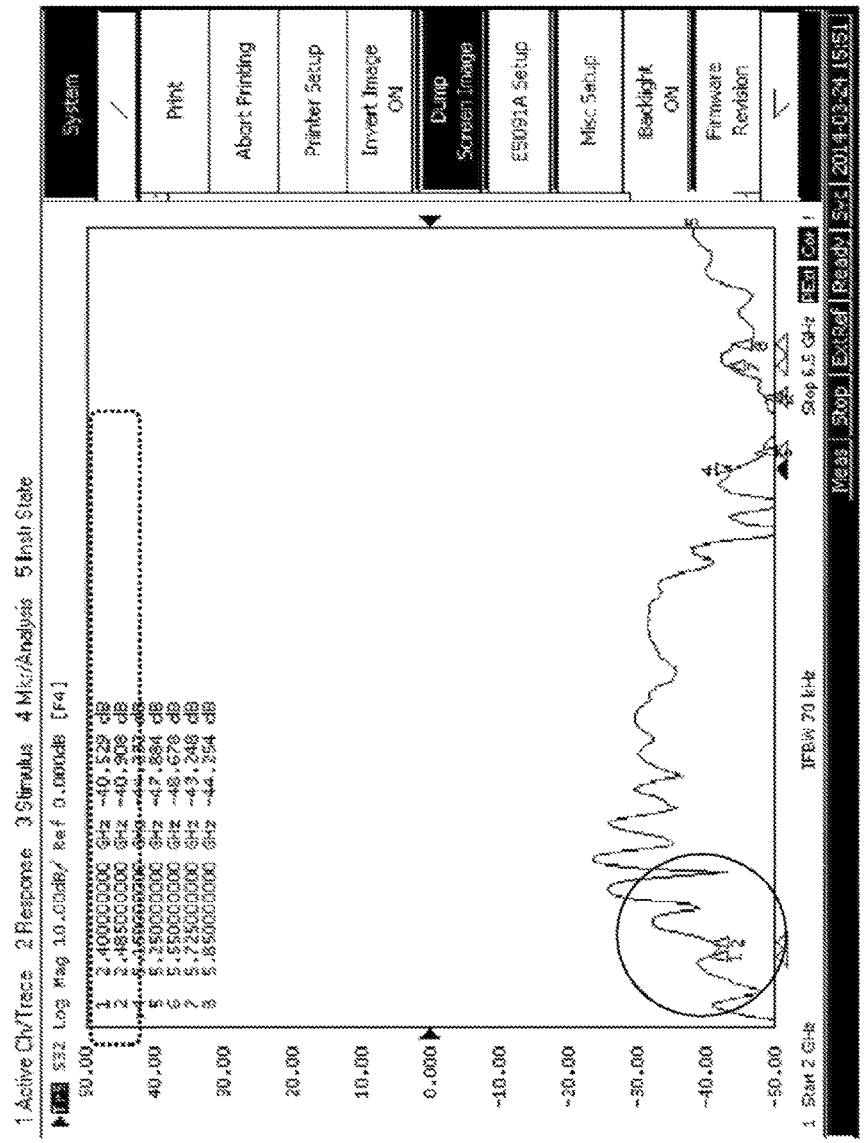
[FIG. 11]

COMMUNICATION MODULE AND COMMUNICATION DEVICE INCLUDING SAME

CROSS-REFERENCE TO RELATED APPLICATIONS

This application is the U.S. national stage application of International Patent Application No. PCT/KR2016/002750, filed Mar. 18, 2016, which claims priority to Korean Application No. 10-2015-0069669, filed May 19, 2015, the disclosures of each of which are incorporated herein by reference in their entirety.

TECHNICAL FIELD

Embodiments relate to a communication module and a communication device including the same.

BACKGROUND ART

The contents disclosed in this section only provide background information about embodiments without constituting prior art.

Portable mobile appliances and home electronic appliances are being continuously developed. In pace with this development, research and development are also being continuously conducted for communication modules installed in such appliances. As a result, such communication modules have enhanced performance.

Communication modules may use a plurality of antennas, to enable communication using the same frequency band or different frequency bands. In particular, a communication module, in which antennas use different frequency bands, to enable dual-band communication, has been developed, and is being widely used.

However, when a plurality of antennas is used, electrical or radio interference may occur among the antennas. As a result, communication performance may be degraded.

In order to reduce such electrical or radio interference among the antennas, a method of increasing the distance between the adjacent antennas, thereby increasing isolation between the antennas, has been proposed. However, this method has a problem in that the spatial efficiency of the associated communication module is degraded.

A method for lowering the radio emissivity of each antenna, thereby reducing interference between antennas, has also been proposed. However, this method has a problem in that the performance of the associated communication module is degraded.

Meanwhile, communication modules may have degraded communication performance due to structures of antennas used therein. For example, when plate-shaped antennas printed on a substrate are used, abrupt degradation of communication performance may occur when the distance between the associated communication module and an external appliance, which is a wireless communication counterpart of the communication module, increases.

DISCLOSURE

Technical Problem

Accordingly, embodiments relate to a communication module capable of reducing electrical or radio interference among antennas thereof while enhancing communication performance through structural improvement of the antennas.

The technical problem to be solved by embodiments is not limited to the technical problem mentioned above, and other technical problems not mentioned will be apparent to those having ordinary skill in the art to which embodiments pertain, based on the following description.

Technical Solution

In one embodiment, a communication module includes a first antennal printed in a plate shape on a substrate, a second antenna printed in a plate shape on the substrate while being spaced apart from the first antenna, a third antenna coupled to the substrate while having a three-dimensional shape, the third antenna being configured to transmit or receive radio waves of a frequency band identical or similar to the first antenna, a fourth antenna coupled to the substrate while having a three-dimensional shape, the fourth antenna being configured to transmit or receive radio waves of a frequency band identical or similar to the second antenna, and an integrated circuit electrically connected to the first to fourth antennas, and mounted on the substrate, the integrated circuit being configured to apply current to the first to fourth antennas and to process a transmission or reception signal associated with the first to fourth antennas.

In another embodiment, a communication module includes a first antennal printed in a plate shape on a substrate, a second antenna printed in a plate shape on the substrate while being spaced apart from the first antenna, a third antenna coupled to the substrate while having a three-dimensional shape, the third antenna being configured to transmit or receive radio waves of a frequency band identical or similar to the first antenna, a fourth antenna coupled to the substrate while having a three-dimensional shape, the fourth antenna being configured to transmit or receive radio waves of a frequency band identical or similar to the second antenna, a first slot formed between the first antenna and the second antenna, and configured to spatially separate the first antenna and the second antenna from each other, an integrated circuit electrically connected to the first to fourth antennas, and mounted on the substrate, the integrated circuit being configured to apply current to the first to fourth antennas and to process a transmission or reception signal associated with the first to fourth antennas, a fifth antenna electrically connected to the integrated circuit, and printed in a plate shape on the substrate while being spaced apart from the first to fourth antennas, and a second slot formed between the first antenna and the fifth antenna, and configured to spatially separate the first antenna and the fifth antenna from each other.

In another embodiment, a communication device includes any one of the above-described communication modules.

Advantageous Effects

The communication module has an effect capable of enhancing communication performance through selective or simultaneous use of a plate-shaped antenna and a three-dimensional antenna, which are printed on a substrate.

In addition, the first and second slots enhance isolation between the associated antennas, thereby remarkably reducing electrical or radio interference between the antennas. Thus, transmission or reception characteristics, performance, etc. of the antennas may be enhanced.

DESCRIPTION OF DRAWINGS

FIG. 1 is a view illustrating a communication module according to an embodiment.

FIG. 2 is a view corresponding to a part A of FIG. 1.

FIG. 3 is a view illustrating a coupled structure of first to fourth antennas to a substrate.

FIG. 4 is a plan view schematically illustrating a communication module according to an embodiment.

FIG. 5 is a view illustrating an arrangement state of a communication module according to an embodiment.

FIGS. 6 to 11 are graphs depicting experiment results for explaining enhancement in isolation between the associated antennas of the communication module according to the embodiment.

BEST MODE

Hereinafter, preferred embodiments will be described in detail with reference to the accompanying drawings. Although embodiments are susceptible to various modifications and alternative forms, specific embodiments will be shown by way of example in the drawings and will herein be described in detail. It should be understood, however, that there is no intent to limit the invention to the particular forms disclosed, but on the contrary, embodiments are to cover all modifications, equivalents, and alternatives falling within the spirit and scope of embodiments. In the drawings, the sizes and shapes of constituent elements may be exaggeratedly illustrated for clarity and convenience of explanation.

In the meantime, although terms including an ordinal number, such as first or second, may be used to describe a variety of constituent elements, the constituent elements are not limited to the terms, and the terms are used only for the purpose of discriminating one constituent element from other constituent elements. In addition, terms specifically defined herein in consideration of the configurations and functions in embodiments are used only to disclose embodiments without limiting the scope of embodiments.

In the following description of embodiments, it will be understood that, when an element is referred to as being "on" or "under" another element, it can be directly on or under another element or can be indirectly formed such that an intervening element is also present. Furthermore, when the expression "on" or "under" is used herein, it may involve not only the upward direction, but also the downward direction, with reference to one element.

In addition, it will be understood that relative terms used hereinafter such as "on"/"above"/"over" and "under"/"below"/"beneath" may be construed only to distinguish one element from another element without necessarily requiring or involving a certain physical or logical relation or sequence between the elements.

FIG. 1 is a view illustrating a communication module according to an embodiment. FIG. 2 is a view corresponding to a part A of FIG. 1. FIG. 3 is a view illustrating a coupled structure of first to fourth antennas 100, 200, 300 and 400 to a substrate 10.

The communication module of the embodiment may include the first to fourth antennas 100, 200, 300 and 400, a first slot 600, an integrated circuit 500, a fifth antenna 700, and a second slot 800. In this case, the above-described elements may be printed on or coupled to the substrate 10.

The first antenna 100 may be printed on the substrate 10 while having a plate shape. The first antenna 100 may transmit and receive a radio wave for wireless communication with an external appliance. Meanwhile, the first antenna 100 may function to transmit or receive a radio wave of a frequency band identical to or similar to that of the third antenna 300.

The first antenna 100 is formed on the substrate 10, to have a printed plate shape. In this case, the first antenna 100 may be formed by etching a conductive plate printed on the substrate 10 and, as such, may have a shape suitable for easy transmission or reception of radio waves.

Meanwhile, since the first antenna 100 is forming on the substrate through printing, the first antenna 100 occupies a smaller space than an antenna having a three-dimensional shape. Accordingly, there is an advantage in that an enhancement in spatial efficiency may be achieved.

The third antenna 300 is coupled to the substrate 10 while having a three-dimensional shape. The third antenna 300 may function to transmit or receive a radio wave of a frequency band identical to or similar to that of the first antenna 100.

Since the third antenna 300 has a three-dimensional shape, the third antenna 300 has a feature in that the radio transmission or reception range thereof is wide, as compared to the first antenna 100 having a plate shape. On the other hand, the first antenna 100 has a narrow radio transmission or reception range, as compared to the third antenna 300, but has an advantage in that power consumption is low.

Accordingly, when both the first antenna 100 and the third antenna 300 are used to transmit or receive frequency waves of the same band or similar frequency bands, respectively, it may be possible to achieve an enhancement in power efficiency and transmission or reception of radio waves in diverse ranges through selective or simultaneous use of the first and third antennas 100 and 300.

In this regard, when the distance of the communication module and an external appliance to communicate with the communication module in a wireless manner is short, it may be possible to reduce power consumption through use of the first antenna 100. On the other hand, when the distance of the communication module and the external appliance for wireless communication is long, it may be possible to achieve effective wireless communication through use of the third antenna 300.

In addition, when the communication module transmits or receives a large amount of data to or from the external appliance, rapid data transmission or reception may be achieved through simultaneous use of the first and third antennas 100 and 300.

Meanwhile, as illustrated in FIG. 2, the first and third antennas 100 and 300 may be installed on the substrate 10 while being electrically separated from each other. Alternatively, the first and third antennas 100 and 300 may be electrically connected to a matching device and the integrated circuit 500 through separate conductive wires.

In this case, a first connection member 110 may be formed at the substrate 10 in order to fix the third antenna 300 to the substrate 10. As illustrated in FIG. 2, the first connection member 110 is formed at a plate-shaped conductive line built on the substrate 10. The third antenna 300 may be coupled to the first connection member 110 through soldering or the like.

Meanwhile, the first and third antennas 100 and 300 receive current in a selective or simultaneous manner by the matching device (not shown). In this case, AC power and AC current may be applied to the first and third antennas 100 and 300.

The matching device may function to adjust a current application direction. That is, the matching device may selectively apply current only to one of the first and third antennas 100 and 300 or may simultaneously apply current to the first and third antennas 100 and 300 through adjustment of the current application direction.

Accordingly, both the first antenna 100 and the third antenna 300 may be configured to be connected to the same matching device. In this case, the matching device may be configured to include an LC (coil-battery) circuit.

The second antenna 200 may be printed in a plate shape on the substrate 10 while being spaced apart from the first antenna 100. In this case, the second antenna 200 may be formed by etching a conductive plate printed on the substrate 10 and, as such, may have a shape suitable for easy transmission or reception of radio waves.

The fourth antenna 400 is coupled to the substrate 10 while having a three-dimensional shape. The fourth antenna 400 may function to transmit or receive radio waves of a frequency band identical or similar to that of the second antenna 200.

The second antenna 200 may have similar characteristics to the first antenna 100. The fourth antenna 400 may have similar characteristics to the third antenna 300.

Accordingly, when the second and fourth antennas 200 and 400 are used to transmit or receive frequency waves of the same frequency band or similar frequency bands, respectively, it may be possible to achieve an enhancement in power efficiency and transmission or reception of radio waves in diverse ranges through selective or simultaneous use of the second and fourth antennas 200 and 400.

In this regard, when the distance between the communication module and an external appliance to communicate with the communication module in a wireless manner is short, it may be possible to reduce power consumption through use of the second antenna 200. On the other hand, when the distance between the communication module and the external appliance for wireless communication is long, it may be possible to achieve effective wireless communication through use of the fourth antenna 400.

In addition, when the communication module transmits or receives a large amount of data to or from the external appliance, rapid data transmission or reception may be achieved through simultaneous use of the second and fourth antennas 200 and 400.

Meanwhile, as illustrated in FIG. 2, the second and fourth antennas 200 and 400 may be installed on the substrate 10 while being electrically separated from each other. Alternatively, the second and fourth antennas 200 and 400 may be electrically connected to a matching device and the integrated circuit 500 through separate conductive wires.

In this case, a second connection member 210 may be formed at the substrate 10 in order to fix the fourth antenna 400 to the substrate 10. As illustrated in FIG. 2, the second connection member 210 is formed at a plate-shaped conductive line formed on the substrate 10. The fourth antenna 400 may be coupled to the second connection member 210 through soldering or the like.

Meanwhile, similarly to the first and third antennas 100 and 300, the second and fourth antennas 200 and 400 receive current in a selective or simultaneous manner by the matching device.

Accordingly, both the second antenna 200 and the fourth antenna 400 may be configured to be connected to the same matching device. In this case, the matching device may be configured to include an LC circuit.

Meanwhile, the first and third antennas 100 and 300 may use the same frequency band as the second and fourth antennas 200 and 400 or a different frequency band from the second and fourth antennas 200 and 400. When the first and third antennas 100 and 300 use a different frequency band from the second and fourth antennas 200 and 400, the communication module may transmit or receive frequencies of a dual band.

Meanwhile, the first to fourth antennas 100, 200, 300 and 400 may be configured as Wi-Fi antennas and, as such, may be used for short-range wireless communication. In this case, accordingly, the communication module may achieve dual-band Wi-Fi communication. In this case, for example, the communication module may transmit or receive radio waves at a frequency of a 2.4 GHz band as one band of the dual band and a frequency of a 5 GHz band as the other band of the dual band.

The integrated circuit 500 is mounted on the substrate 10 while being electrically connected to the first to fourth antennas 100, 200, 300 and 400. The integrated circuit 500 may function to apply current to the first to fourth antennas 100, 200, 300 and 400 and to process transmission or reception signals associated with the first to fourth antennas 100, 200, 300 and 400.

In addition, the integrated circuit 500 is electrically connected to the fifth antenna 700, which will be described later. The integrated circuit 500 may function to apply current to the fifth antennas 500 and to process a transmission or reception signal associated with the fifth antenna 700.

The first slot 600 may be formed between the first antenna 100 and the second antenna 200. That is, the first slot 600 may be formed at the substrate 10 between the first antenna 100 and the second antenna 200 in order to spatially separate the first and second antennas 100 and 200 from each other.

As illustrated in FIG. 1, the first slot 600 may formed by etching a conductive plate printed on the substrate 10. That is, the first slot 600 is a region where a portion of the conductive plate is removed.

Referring to FIG. 1, the first slot 600 may be formed to take, for example, the shape of a bar formed through partial removal of the conductive plate between the first antenna 100 and the second antenna 200. In detail, the first slot 600 may have a structure including the above-described bar, and another bar extending from one end of the former bar while perpendicularly crossing the former bar.

In accordance with this structure, the first slot 600 may function to prevent electrical connection between the first antenna 100 and the second antenna 200. In addition, the first slot 600 may function to prevent electrical connection between the third antenna 300 and the fourth antenna 400.

When the first slot 600 is not provided, the first and second antennas 100 and 200 may be electrically connected through the conductive plate provided therebetween. In addition, generally, the first and second antennas 100 and 200 may be grounded in common by the conductive plate provided therebetween.

Accordingly, when the first slot 600 is not provided, electrical or radio interference may occur between the first antenna 100 and the second antenna 200 due to the above-described structure. Due to such interference, transmission or reception characteristics, performance, etc. of the first and second antennas 100 and 200 may be degraded.

In addition, when the slot 600 is not provided, transmission or reception characteristics, performance, etc. of the third and fourth antennas 300 and 400 may be degraded, similarly to the first and second antennas 100 and 200.

Thus, the first slot 600 enhances isolation between the first antenna 100 and the second antenna 200 and between third antenna 300 and the fourth antenna 400 by preventing electrical connection between the associated antennas, thereby remarkably reducing electrical or radio interference between the associated antennas. Accordingly, it may be possible to enhance transmission or reception characteristics, performance, etc.

Meanwhile, as illustrated in FIG. 3, the third antenna 300 may include a plate-shaped body, and a plurality of bent portions extending from the body in a bent manner. A part of the bent portions is coupled to the first connection member 110 so as to be electrically connected to the integrated circuit 500, and, as such, may receive current from the integrated circuit 500.

The third antenna 300 has a three-dimensional structure as described above and, as such, may easily transmit or receive radio waves, as compared to the plate-shaped first antenna 100.

In addition, as illustrated in FIG. 3, the fourth antenna 400 may have a similar three-dimensional structure to the third antenna 300. Accordingly, the fourth antenna 400 may easily transmit or receive radio waves, as compared to the plate-shaped second antenna 200, and, as such, achieve easy transmission or reception of radio waves in association with an external appliance spaced apart from the communication module by a long distance.

The fifth antenna 700 may be printed in a plate shape on the substrate 10 while being spaced apart from the first to fourth antennas 100, 200, 300 and 400 in a state of being electrically connected to the integrated circuit 500. In this case, the fifth antenna 700 may be formed by etching a conductive plate printed on the substrate 10 and, as such, may have a shape suitable for easy transmission or reception of radio waves.

In this case, the fifth antenna 700 may be used for a kind of wireless communication different from that of the first to fourth antennas 100, 200, 300 and 400. Accordingly, when the first to fourth antennas 100, 200, 300 and 400 are configured as Wi-Fi antennas in accordance with an embodiment, the fifth antenna 700 may be configured as, for example, a Bluetooth antenna.

The second slot 800 may be formed between the first antenna 100 and the fifth antenna 700. That is, the second slot 800 may be formed at the substrate 10 between the first antenna 100 and the fifth antenna 700 in order to spatially separate the first and fifth antennas 100 and 700 from each other.

The second slot 800 may be formed to have a similar shape to the first slot 600, and may have a function identical or similar to that of the first slot 600. That is, as illustrated in FIG. 1, the second slot 800 may be formed by etching a conductive plate printed on the substrate 10. The second slot 800 is a region where a portion of the conductive plate is removed.

The second slot 800 may be formed to have, for example, the shape of a bar formed through partial removal of the conductive plate between the first antenna 100 and the fifth antenna 700. In detail, the second slot 800 may have a structure including the above-described bar, and another bar extending from one end of the former bar while perpendicularly crossing the former bar.

The second slot 800 may function to prevent electrical connection between the first antenna 100 and the fifth antenna 700. In addition, the second slot 800 may function to prevent electrical connection between the third antenna 300 and the fifth antenna 700.

Thus, the second slot 800 enhances isolation between the first antenna 100 and the fifth antenna 700 and between third antenna 300 and the fifth antenna 700 by preventing electrical connection between the associated antennas, thereby remarkably reducing electrical or radio interference between the associated antennas. Accordingly, it may be possible to enhance transmission or reception characteristics, performance, etc.

Meanwhile, in another embodiment, the second slot 800 may be formed between the second antenna 200 and the fifth antenna 700 in order to spatially separate the second and fifth antennas 200 and 700 from each other. In this case, the second slot 800 remarkably reduces electrical or radio interference between the second antenna 200 and the fifth antenna 700 or between the fourth antenna 400 and the fifth antenna 700. Accordingly, it may be possible to enhance transmission or reception characteristics, performance, etc. of each antenna.

FIG. 4 is a plan view schematically illustrating a communication module according to an embodiment. FIG. 5 is a view illustrating an arrangement state of a communication module according to an embodiment.

FIG. 5 schematically illustrates the arrangement of each antenna for an experiment for measuring isolation between the associated antennas when the communication module is arranged as illustrated in, for example, FIG. 4.

In the experiment, for convenience, isolation among the first antenna 100, second antenna 200 and fifth antenna 700 is measured, and the third antenna 300 and the fourth antenna 400 have been excluded from the experiment. Of course, it is apparent that isolation of the third and fourth antennas 300 and 400 in the communication mode of the embodiment is enhanced.

Results of an experiment conducted for isolation S1 between the first antenna 100 and the second antenna 200 are depicted by graphs in FIGS. 6 and 7. Results of the experiment conducted for isolation S3 between the second antenna 200 and the fifth antenna 700 are depicted by graphs in FIGS. 8 and 9.

FIGS. 6 to 11 are graphs depicting experiment results for explaining enhancement in isolation between the associated antennas of the communication module according to the embodiment. Isolation is represented in decibel (dB). When an absolute value of isolation increases, isolation is enhanced. In addition, when the isolation between the associated antennas is enhanced, electrical or radio interference between the antennas is reduced and, as such, transmission or reception characteristics, performance, etc. may be enhanced.

The experiment is conducted for a frequency band of about 2.4 GHz to about 5 GHz. In the experiment, isolations at frequencies of first and second points in the vicinity of the frequency band of 2.4 GHz are derived in the form of numerical values. The frequencies, at which isolations are derived, are indicated by circles in FIGS. 7, 9 and 11.

FIGS. 6 and 7 depict results of the experiment conducted for isolation S1 between the first antenna 100 and the second antenna 200. FIG. 6 depicts experimental results as to a communication module in which the first slot 600 and second slot 800 are not formed. FIG. 7 depicts experimental results as to a communication module in which the first slot 600 and second slot 800 are formed.

After comparing isolations at the first and second points indicated by hidden lines in FIGS. 6 and 7, it can be seen that the absolute value of isolation in the case of FIG. 7 is greater than that of FIG. 6.

Accordingly, it can be seen that the communication module of the embodiment in which the first and second slot 600 and 800 are formed exhibit enhanced isolation, as compared to the communication module in which the first and second slot 600 and 800 are not formed.

FIGS. 8 and 9 depict results of the experiment conducted for isolation S2 between the first antenna 100 and the fifth antenna 700. FIG. 8 depicts experimental results as to a communication module in which the first slot 600 and second slot 800 are not formed. FIG. 9 depicts experimental results as to a communication module in which the first slot 600 and second slot 800 are formed.

After comparing isolations at the first and second points indicated by hidden lines in FIGS. 8 and 9, it can be seen that the absolute value of isolation in the case of FIG. 9 is greater than that of FIG. 8.

Accordingly, it can be seen that the communication module of the embodiment in which the first and second slot 600 and 800 are formed exhibit enhanced isolation, as compared to the communication module in which the first and second slot 600 and 800 are not formed.

FIGS. 10 and 11 depict results of the experiment conducted for isolation S3 between the second antenna 200 and the fifth antenna 700. FIG. 10 depicts experimental results as to a communication module in which the first slot 600 and second slot 800 are not formed. FIG. 11 depicts experimental results as to a communication module in which the first slot 600 and second slot 800 are formed.

After comparing isolations at the first and second points indicated by hidden lines in FIGS. 10 and 11, it can be seen that the absolute value of isolation in the case of FIG. 11 is greater than that of FIG. 10, similarly to the above-described experimental results.

Accordingly, it can be seen that the communication module of the embodiment in which the first and second slot 600 and 800 are formed exhibit enhanced isolation, as compared to the communication module in which the first and second slot 600 and 800 are not formed.

As apparent from the above-described experimental results, the first slot 600 and the second slot 800 enhance isolation between the associated antennas, thereby remarkably reducing electrical or radio interference between the antennas. Thus, transmission or reception characteristics, performance, etc. of the antennas may be enhanced.

Meanwhile, the communication module having the above-described configuration may be installed in a communication device equipped in a smart TV, a portable mobile appliance, etc. The communication device provided with the communication module of the embodiment may exhibit enhanced communication characteristics and performance, similarly to the communication module.

Although several embodiments have been described, other embodiments may be implemented in various forms. The technical contents of the above-described embodiments may be combined in various forms, so long as there is no compatibility thereamong, and new embodiments may be implemented through such combination.

INDUSTRIAL APPLICABILITY

Communication modules of the embodiments have an effect capable of enhancing communication performance through selective or simultaneous use of a plate-shaped antenna and a three-dimensional antenna. Accordingly, the communication modules have industrial applicability.

The invention claimed is:

1. A communication module comprising:
a first antennal printed in a plate shape on a substrate;
a second antenna printed in a plate shape on the substrate while being spaced apart from the first antenna;
a third antenna coupled to the substrate while having a three-dimensional shape, the third antenna being configured to transmit or receive radio waves of a frequency band identical or similar to the first antenna;
a fourth antenna coupled to the substrate while having a three-dimensional shape, the fourth antenna being configured to transmit or receive radio waves of a frequency band identical or similar to the second antenna;
an integrated circuit electrically connected to the first to fourth antennas, and mounted on the substrate, the integrated circuit being configured to apply current to the first to fourth antennas and to process a transmission or reception signal associated with the first to fourth antennas; and
a fifth antenna electrically connected to the integrated circuit and printed in a plate shape on the substrate while being spaced apart from the first to fourth antennas.

2. The communication module according to claim 1, wherein each of the first to fourth antennas is a Wi-Fi antenna.

3. The communication module according to claim 1, wherein a first slot is formed at the substrate between the first antenna and the second antenna, and configured to spatially separate the first antenna and the second antenna from each other.

4. The communication module according to claim 3, wherein the first slot prevents electrical connection between the first antenna and the second antenna and electrical connection between the third antenna and the fourth antenna.

5. The communication module according to claim 3, wherein the first slot is formed by etching a portion of a conductive plate printed on the substrate.

6. The communication module according to claim 1, wherein the first antenna and the third antenna receive current in a selective or simultaneous manner by a matching device.

7. The communication module according to claim 1, wherein the second antenna and the fourth antenna receive current in a selective or simultaneous manner by a matching device.

8. A communication device comprising the communication module defined in claim 1.

9. The communication module according to claim 1, wherein the fifth antenna is a Bluetooth antenna.

10. The communication module according to claim 1, wherein a second slot is formed at the substrate between the first antenna and the fifth antenna, and configured to spatially separate the first antenna and the fifth antenna from each other.

11. The communication module according to claim 10, wherein the second slot prevents electrical connection between the first antenna and the fifth antenna and electrical connection between the third antenna and the fifth antenna.

12. The communication module according to claim 10, wherein the second slot is formed by etching a portion of a conductive plate printed on the substrate.

13. A communication module comprising:
a first antennal printed in a plate shape on a substrate;
a second antenna printed in a plate shape on the substrate while being spaced apart from the first antenna;
a third antenna coupled to the substrate while having a three-dimensional shape, the third antenna being configured to transmit or receive radio waves of a frequency band identical or similar to the first antenna;
a fourth antenna coupled to the substrate while having a three-dimensional shape, the fourth antenna being configured to transmit or receive radio waves of a frequency band identical or similar to the second antenna;
a first slot formed between the first antenna and the second antenna and configured to spatially separate the first antenna and the second antenna from each other;
an integrated circuit electrically connected to the first to fourth antennas and mounted on the substrate, the integrated circuit being configured to apply current to the first to fourth antennas and to process a transmission or reception signal associated with the first to fourth antennas;
a fifth antenna electrically connected to the integrated circuit and printed in a plate shape on the substrate while being spaced apart from the first to fourth antennas; and
a second slot formed between the first antenna and the fifth antenna and configured to spatially separate the first antenna and the fifth antenna from each other.

14. The communication module according to claim 13, wherein the first and third antennas perform transmission and reception at a frequency of a different band from the second and fourth antennas.

15. The communication module according to claim 13, wherein the first antenna and the second antenna constitute two antenna pairs together with the third antenna, respectively, and one of the antenna pairs performs transmission and reception at a frequency of a 2.4 GHz band, and the other antenna pair performs transmission and reception at a frequency of a 5 GHz band.

16. The communication module according to claim 13, wherein each of the first to fourth antennas is a dual-band Wi-Fi antenna.

17. The communication module according to claim 13, wherein the fifth antenna is used for a different kind of wireless communication from the first to fourth antennas.

18. The communication module according to claim 17, wherein the fifth antenna is a Bluetooth antenna, and each of the first to fourth antennas is a Wi-Fi antenna.

19. The communication module according to claim 13, wherein the first slot or the second slot is formed by etching a portion of a conductive plate printed on the substrate such that the conductive plate portion is removed.

* * * * *